US011982305B1

(12) United States Patent
Cifers et al.

(10) Patent No.: US 11,982,305 B1
(45) Date of Patent: May 14, 2024

(54) ACCESSORY MOUNTING TRACK WITH T-BOLT ALIGNMENT

(71) Applicant: Luther Cifers, Farmville, VA (US)

(72) Inventors: Luther Cifers, Farmville, VA (US); Daniel Anderson Newman, Salem, VA (US)

(73) Assignee: YakAttack LLC, Farmville, VA (US)

( * ) Notice: Subject to any disclaimer, the term of this patent is extended or adjusted under 35 U.S.C. 154(b) by 532 days.

(21) Appl. No.: 17/102,174

(22) Filed: Nov. 23, 2020

Related U.S. Application Data

(60) Provisional application No. 62/939,613, filed on Nov. 23, 2019.

(51) Int. Cl.
*F16B 37/04* (2006.01)

(52) U.S. Cl.
CPC .................. *F16B 37/045* (2013.01)

(58) Field of Classification Search
CPC .............. F16B 37/045; B60P 7/0815
USPC ................... 411/166, 84, 85, 104
See application file for complete search history.

(56) References Cited

U.S. PATENT DOCUMENTS

| | | | | |
|---|---|---|---|---|
| 1,033,758 A * | 7/1912 | Howell | ................ | B25B 5/106 411/84 |
| 2,513,037 A * | 6/1950 | McLaughlin | ......... | F16B 37/044 411/169 |
| 2,807,883 A * | 10/1957 | Mayne | ................ | B23Q 3/102 33/567 |
| 3,483,910 A * | 12/1969 | Van Huffel | ........... | F16B 37/046 411/84 |
| 4,383,505 A * | 5/1983 | Hanaoka | ................ | F02P 7/02 403/373 |
| 4,661,006 A * | 4/1987 | Stevens | ................ | B42F 13/06 411/84 |
| 4,850,063 A * | 7/1989 | Abbate | ................ | E03D 11/16 411/85 |
| 5,259,711 A * | 11/1993 | Beck | ................ | B60P 7/0815 410/104 |
| 5,674,033 A * | 10/1997 | Ruegg | ................ | B60P 3/079 410/23 |
| 5,794,901 A * | 8/1998 | Sigel | ................ | G09B 25/02 248/221.11 |
| 6,164,882 A * | 12/2000 | Selle | ................ | B60P 7/0815 410/2 |
| 6,447,200 B1 * | 9/2002 | Hungerford, III | .... | F16B 37/045 403/374.1 |
| 7,401,995 B2 * | 7/2008 | Senakiewich, II | .... | F16B 37/045 403/258 |

(Continued)

FOREIGN PATENT DOCUMENTS

| | | | | |
|---|---|---|---|---|
| DE | 3437491 A1 * | 6/1986 | .............. | F16B 35/06 |
| EP | 3081708 * | 10/2016 | .............. | F16B 37/04 |

(Continued)

*Primary Examiner* — Victor D Batson
*Assistant Examiner* — Dil K. Magar
(74) *Attorney, Agent, or Firm* — Thedford I. Hitaffer; Hitaffer & Hitaffer, PLLC

(57) ABSTRACT

A track is provided with a geometry that automatically aligns a T-bolt with the opening at the terminal end of the track to make the use of the T-bolt and track combination faster and easier, and allow single-handed installation of T-bolts and accessories using T-bolts with slotted accessory mounting tracks.

10 Claims, 3 Drawing Sheets

(56) References Cited

U.S. PATENT DOCUMENTS

| | | | | |
|---|---|---|---|---|
| 7,410,127 | B1* | 8/2008 | Ahad | B64C 1/20 |
| | | | | 244/118.6 |
| 7,874,774 | B2* | 1/2011 | Peterson | B60P 7/0815 |
| | | | | 410/104 |
| 8,100,600 | B2* | 1/2012 | Blum | F16B 37/045 |
| | | | | 403/256 |
| 8,844,888 | B1* | 9/2014 | Gretz | F16L 3/2431 |
| | | | | 403/348 |
| 9,671,060 | B1* | 6/2017 | Cifers | F16M 11/2085 |
| 9,828,073 | B1* | 11/2017 | Cifers, III | F16M 13/02 |
| 2001/0008600 | A1* | 7/2001 | Fraleigh | F16B 35/06 |
| | | | | 411/252 |
| 2002/0071735 | A1* | 6/2002 | Dinh | F16B 37/046 |
| | | | | 411/85 |
| 2002/0110435 | A1* | 8/2002 | Herb | F16B 37/045 |
| | | | | 411/84 |
| 2002/0121558 | A1* | 9/2002 | Herb | F16B 37/045 |
| | | | | 238/310 |
| 2003/0095846 | A1* | 5/2003 | Breckel | B61D 45/001 |
| | | | | 410/104 |
| 2003/0156919 | A1* | 8/2003 | Schwarz | F16B 37/045 |
| | | | | 403/252 |
| 2005/0175426 | A1* | 8/2005 | Kroll | B60P 7/0815 |
| | | | | 410/77 |
| 2006/0222455 | A1* | 10/2006 | Senakiewich | B60P 7/0815 |
| | | | | 403/252 |
| 2009/0224119 | A1* | 9/2009 | Heffernan | A47B 96/066 |
| | | | | 248/220.21 |
| 2009/0279944 | A1* | 11/2009 | Schmitz | F16C 11/0628 |
| | | | | 403/135 |
| 2010/0102011 | A1* | 4/2010 | Blum | F16B 37/045 |
| | | | | 211/8 |
| 2012/0045276 | A1* | 2/2012 | Carnevali | F16B 7/20 |
| | | | | 403/350 |
| 2014/0003878 | A1* | 1/2014 | Knox | B60P 7/0815 |
| | | | | 410/104 |
| 2015/0176631 | A1* | 6/2015 | McCarthy | F16B 37/045 |
| | | | | 411/85 |
| 2015/0204372 | A1* | 7/2015 | West | F16B 7/187 |
| | | | | 411/85 |
| 2016/0305114 | A1* | 10/2016 | Albartus | E04B 1/4107 |
| 2016/0305115 | A1* | 10/2016 | Albartus | E04B 1/4107 |
| 2017/0313225 | A1* | 11/2017 | Akaike | F16B 5/0225 |
| 2018/0347749 | A1* | 12/2018 | Carnevali | F16M 11/043 |
| 2021/0095815 | A1* | 4/2021 | Carnevali | F16M 11/043 |

FOREIGN PATENT DOCUMENTS

| | | | | |
|---|---|---|---|---|
| EP | 3339101 | A1* | 6/2018 | B60R 9/052 |
| FR | 2868159 | A1* | 9/2005 | F15B 15/2892 |
| GB | 2436819 | * | 10/2007 | B60P 7/0815 |
| GB | 2436819 | A* | 10/2007 | B60P 7/15 |
| KR | 1302458 | B1* | 9/2013 | E04B 1/4107 |

* cited by examiner

ACCESSORY MOUNTING TRACK WITH T-BOLT ALIGNMENT

CROSS-REFERENCE TO RELATED APPLICATIONS

This application claims the benefit of U.S. Provisional Application No. 62/939,613, filed Nov. 23, 2019, the disclosure of which is incorporated herein by reference.

BACKGROUND OF THE INVENTION

This invention relates in general to accessory mounting tracks and more particularly, to accessory mounting tracks with geometry configured to align a T-bolt therewith.

Accessory mounting tracks for use with T-bolts for mounting accessories to the tracks are known. Such tracks are provided with a slot in the top of the track and an interior that is generally T-shaped for receiving a T-bolt.

A T-bolt usually comprises a threaded shaft that extends upward from a head, which is concentrically mounted to a lower end of the shaft. The head of the T-bolt is an elongate head comprised of opposing flanges that extend in opposing directions in relation to opposing sides of the threaded stud, so that the stud is centrally located in relation to the flanges.

The head has a length and a width, wherein the length is longer than the width, wherein the length of the head is longer than the width of the interior of the track. The head is insertable lengthwise into the opening at the terminal end of the track because the width of the head is narrower than the width of the interior of the track. However, because the length of the T-bolt is longer than the width of the track, rotation of the head and thus, the T-bolt, in relation to the track is limited.

The T-bolt is usually insertable into the interior of the track at an opening at a terminal end of the track. If the T-bolt is not properly aligned with the opening, the T-bolt could get jammed at the opening (i.e., stuck or unable to travel in a desired direction due to impediments on either side of a central axis of the T-bolt, thus preventing rotation of the T-bolt in relation to the interior of the track). This produces difficulty and requires greater time to insert the head into the track, and likewise, produces difficulty and requires greater time to mount an accessory to the track with the T-bolt.

Aligning the T-bolt with the opening can be accomplished with two hands. One hand is required for holding the T-bolt, together with an accessory threaded onto the T-bolt, at the open end of the track. Another hand is required for aligning the head of the T-bolt with the interior of the track so that the head of the T-bolt can be readily inserted into the interior of the track.

What is needed is a track with a geometry that is configured to align a T-bolt with the opening of the track, so that single-handed mounting of an accessory with the T-bolt is accomplished easier and faster.

SUMMARY OF THE INVENTION

This invention relates to aligning a T-bolt for entry into a terminal end of an accessory mounting track. A track is provided with a geometry that automatically aligns the T-bolt with the opening at the terminal end of the track to make the use of the T-bolt and track combination faster and easier, and to allow single-handed installation of T-bolts and accessories using T-bolts with slotted accessory mounting tracks.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the T-bolt locking device will become more fully appreciated when considered in view of the accompanying drawings, in which like reference characters designate the same or similar parts and/or features throughout the several views, and wherein.

DETAILED DESCRIPTION OF THE PREFERRED EMBODIMENT

Figure 1:
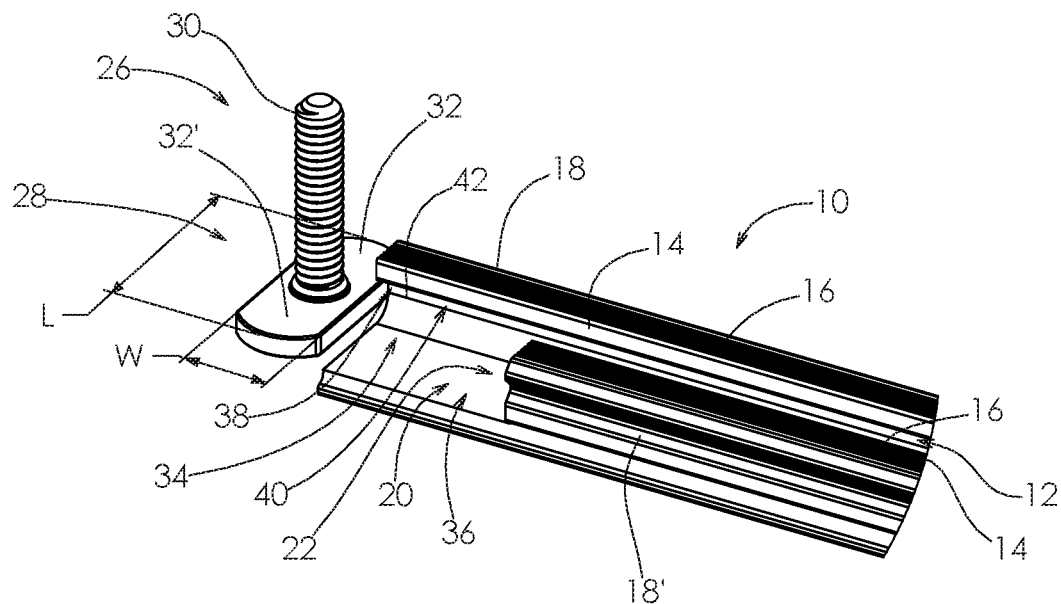
FIG. 1 is a perspective view of an accessory mounting track incorporating geometry configured to align a T-bolt therewith.

Referring now to the drawings, there is illustrated in FIG. 1 a side perspective view of an exemplary accessory mounting track 10 comprising a slot 12 bounded by opposing upper walls 14, which define an upper surface 16 for engagement with an accessory attached or mounted to the track 10. The track 10 has opposing side walls 18, 18', from which the upper walls 14 extend in a cantilevered manner. The track 10 has an interior 20 bounded at least partially by the opposing upper walls 14 and the opposing side walls 18, 18'. The interior 20 has a general T-shape for receiving a T-bolt 26. The track 10 can be a separate component configured to mount to an environmental surface, or recess within an environmental surface, or be an integral part of an environmental surface, including the surface of any vehicle or vessel, such as, for example, the hull of a marine vessel, such as a kayak.

There is also illustrated an exemplary T-bolt 26. The T-bolt 26 comprises a head 28 and a threaded shaft 30 extending from the head 28. The head 28 comprises opposingly directed flanges 32, 32' extending in relation to opposing sides of the threaded shaft 30. For example, the head 28 may be supported concentrically in relation to the threaded shaft 30 so that the flanges 32, 32' extend in opposing directions in relation to the sides of the threaded shaft 30. For purposes of establishing orientation, the head 28 is elongated in shape, having a length L in a longitudinal direction and a width W in a lateral direction.

The alignment geometry 34 comprises a physical space 36 for receiving a planar geometry of the head 28 of the T-bolt 26. A first alignment feature 38 is provided within the space 36. The first alignment feature 38 cooperates with a terminal end of the head 28 of the T-bolt 26. The first alignment feature 38 is arranged to be off-center of the T-bolt 26 when inserted into the track 10 to cause the T-bolt 26 to rotate about a center of rotation of the T-bolt 26, as illustrated in FIG. 1. In a direction of travel of the T-bolt 26, in a lengthwise direction of the track 10, past the first alignment feature 38 acting to rotate the T-bolt 26, a second alignment feature 40 acts to stop the rotation of the T-bolt 26 and generally align the T-bolt 26 with the interior 20 and the slot 12 of the track 10. In other words, the first alignment feature 38 is a rotation feature to cause the T-bolt 26 to rotate and the second alignment feature 40 is a stop feature to cause the T-bolt 26 to stop rotating. These features 38, 40 are both presented to one side of the interior 20 of the track 10 at the opening 22 at the terminal end 24 of the track 10.

In the exemplary track shown in FIG. 1, one of the opposing side walls, a first side wall 18, extends longitudinally (i.e., lengthwise) of the track 10 further than the other one of the opposing side walls, a second side wall 18', so that a terminal end of the first side wall 18 functions as the first alignment feature 38 (i.e., a rotation feature). Upon inserting the T-bolt 26 in the opening 22 at the terminal end 24, with the first side wall 18 off-center of the T-bolt 26, a flange 32 of the head 28 of the T-bolt 26 meets the first side wall 18. As is clearly shown, the first side wall 18 is presented to one side of the interior 20 of the track 10. Upon meeting the first side wall 18, continued movement of the T-bolt 26 in a longitudinal direction of the track 10 causes the T-bolt 26 to rotate (in a counter-clockwise direction when viewing FIG. 1) in a physical space 36 adjacent the first side wall 18 proximate the opening 22 at the terminal end 24 of the track 10. With continued movement of the T-bolt 26 in the longitudinal direction, the T-bolt 26 continues to rotate until the leading flange 32' of the head 28 of the T-bolt 26 engages an inner surface 42 of the first side wall 18. The inner surface 42 of the first sidewall 18 functions as the second alignment feature 40 (i.e., the stop feature) to stop the rotation of the T-bolt 26. Continued movement of the T-bolt 26 in the longitudinal direction of the track 10 urges the head 28 of the T-bolt 26 into the interior 20 of the track 10 and the threaded shaft 30 into the slot 12 of the track 10. The varied lengths of the first and second walls 18, 18' provides the physical space 36 that permits unencumbered rotation of the head 28 of the T-bolt 26 upon inserting the T-bolt 26 into the track 10. This embodiment of the track 10 incorporates the T-bolt alignment geometry 34 into the track 10 and is suitable for mounting to an environmental mounting surface or mounting in a recessed manner within the environmental mounting surface.

Figure 2:
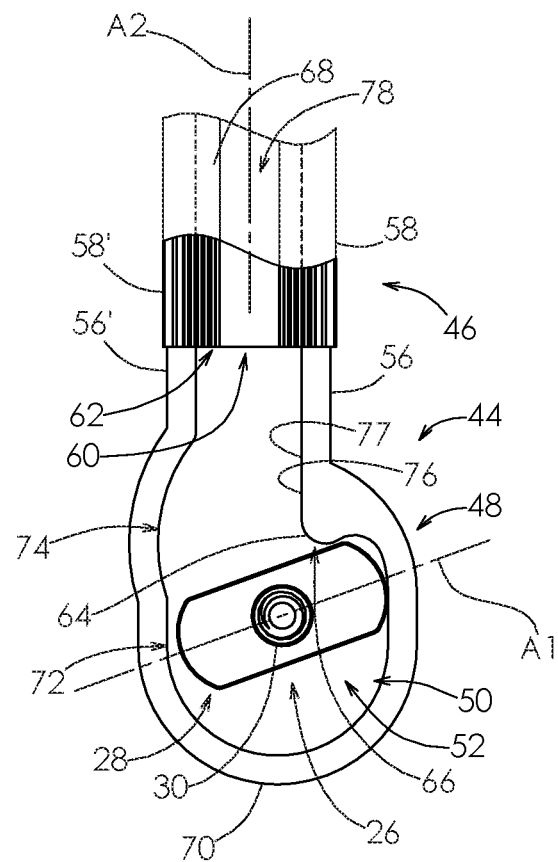
FIG. 2 is a top plan view of T-bolt alignment geometry as a secondary component in communication with a track.

In FIG. 2, there is illustrated a top plan view of an exemplary T-bolt alignment geometry 44, which is in the form of a secondary component that is configured to be supported in relation to an accessory mounting track 46, in communication with the track 46. The T-bolt alignment geometry 44 is at least partially defined by a perimeter wall 48, which defines a pocket 50 that bounds a physical space 52 dimensioned and configured to receive the head 28 of a T-bolt 26, as shown in the drawing. The perimeter wall 48 is shaped to form a first side wall 56 that extends longitudinally (i.e., lengthwise) from a first side wall 58 of the track 46 at the opening 60 at the terminal end 62 of the track 46. The perimeter wall 48 extends about the physical space 52 and returns back to a second side wall 56' that extends into a second side wall 58' of the track 46 at the opening 60 at the terminal end 62 of the track 46 so as to extend longitudinally (i.e., lengthwise) from the second side wall 58' of the track 46. An inner surface 64 of the perimeter wall 48 is bumped out to form a first alignment feature 66 (i.e., a rotation feature), which is encountered by a flange 32 of the head 28 of the T-bolt 26 upon moving the T-bolt 26 in a longitudinal direction (i.e., vertically upward) toward the opening 60 at the terminal end 62 of the track 46. As clearly shown, the first alignment feature 66 is presented to one side of the alignment geometry 44, and thus is presented to one side in relation to the interior 68 of the track 46 proximate the opening 60 at the terminal end 62 of the track 46. When the head 28 of the T-bolt 26 encounters the first alignment feature 66, the first alignment feature 66 causes the head 28 to rotate (i.e., in a clockwise direction when viewing FIG. 2). The distal end 70 of the alignment geometry 44, farthest from the track 46, provides a first clearance 72 for the rotation of the head 28 of the T-bolt 26, as can be clearly understood when viewing FIG. 2. A further or second clearance 74 is provided beyond the first alignment feature 66, between the first alignment feature 66 and the side walls 56, 56' of the alignment geometry 44. This permits the head 28 of the T-bolt 26 to continue to rotate (i.e., in a clockwise direction) until a leading flange 32' of the head 28 of the T-bolt 26 encounters an inner surface 76 of a side wall 56 of the alignment geometry 44. This inner surface 76 forms a second alignment feature 77 of the alignment geometry 44. As should be clearly understood, the second alignment feature 77 stops the T-bolt 26 from rotating at a point in which the head 28 of the T-bolt 26 is positioned in a longitudinal direction in relation to the track 46. That is to say, the longitudinal axis A1 of the head 28 of the T-bolt 26 is aligned with the longitudinal axis L2 of the track 46. More particularly, the head 28 of the T-bolt 26 is aligned with the interior 68 of the track 46 so that head 28 of the T-bolt 26 may move longitudinally within the interior 68 of the track 46 with the threaded shaft 30 extending upward from the head 28 through the slot 78 in the track 46.

Figure 3:
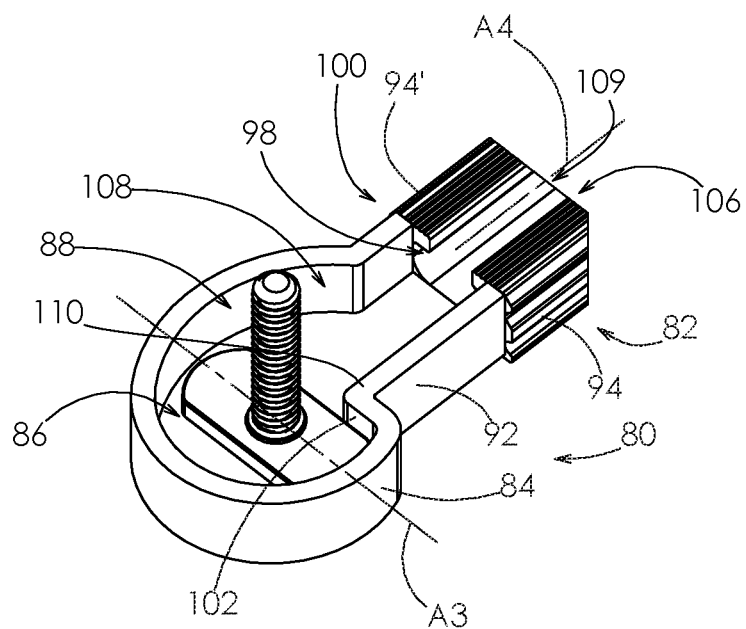
FIGS. 3-5 are perspective views of T-bolt alignment geometry as secondary components in communication with tracks.
Figure 4:
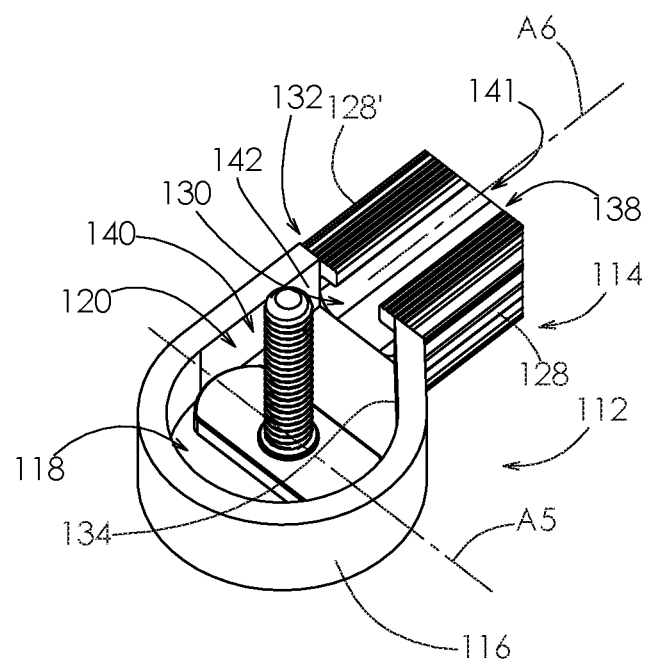
Figure 5:
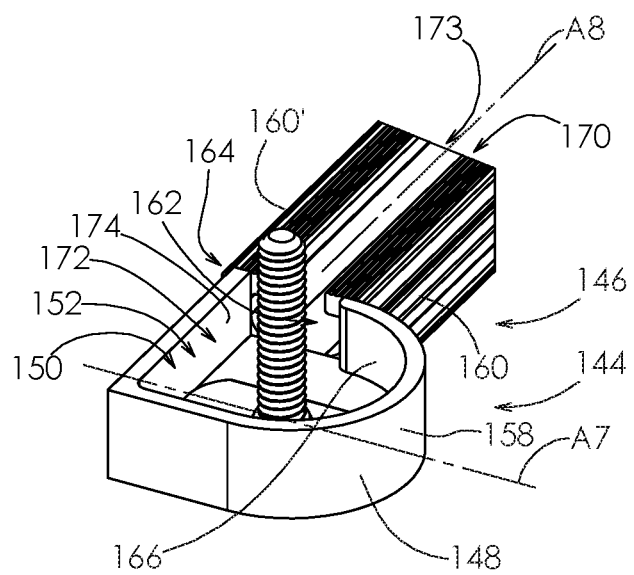

Additional embodiments of T-bolt alignment geometries 80, 112, 144, which are in the form of secondary components, that are configured to be supported in relation to an accessory mounting track 82, 114, 146, in communication with the track 82, 114, 146 are shown in FIGS. 3-5. Each of these alignment geometries 80, 112, 144 is at least partially defined by a perimeter wall 84, 116, 148, which defines a pocket 86, 118, 150 that bounds a physical space 88, 120, 152 dimensioned and configured to receive the head 28 of a T-bolt 26. The perimeter wall 84, 116, 148 is shaped to form a first side wall 92, 126, 158 that extends from a first side wall 94, 128, 160 of the track 82, 114, 146 at the opening 98, 130, 162 at the terminal end 100, 132, 164 of the track 82, 114, 146. The perimeter wall 84, 116, 148 extends about the physical space 88, 120, 152 and returns back to a second side wall 94', 128', 160' of the track 82, 114, 146 at the opening 98, 130, 162 at the terminal end 100, 132, 164 of the track 82, 114, 146. An inner surface 102, 134, 166 of the perimeter wall 84, 116, 148 functions as a first alignment feature (i.e., a rotation feature), which is encountered by the a flange 32 of the head 28 of the T-bolt 26 upon moving the T-bolt 26 in a longitudinal direction toward the opening 98, 130, 162 at the terminal end 100, 132, 164 of the track 82, 114, 146. The first alignment feature 102, 134, 166 is presented to one side of the alignment geometry 80, 112, 144, and thus is presented to one side in relation to the interior 106, 138, 170 of the track 82, 114, 146 proximate the opening 98, 130, 162 at the terminal end 100, 132, 164 of the track 82, 114, 146. When the head 28 of the T-bolt 26 encounters the first alignment feature 102, 134, 166, the first alignment feature 102, 134, 166 causes the head 28 to rotate (i.e., in a clockwise direction when viewing the drawings). A second clearance 108, 140, 172 is provided beyond the first alignment feature 102, 134, 166. With continued movement of the T-bolt 26, the head 28 of the T-bolt 26 continues to rotate (i.e., in a clockwise direction) until a leading flange 32' of the head 28 of the T-bolt 26 encounters an inner surface 110, 142, 174 of the perimeter wall 84, 116, 148. This inner surface 110, 142, 174 forms a second alignment feature, which stops the T-bolt 26 from rotating at a point in which the head 28 of the T-bolt 26 is positioned in a longitudinal direction in relation to the track 82, 114, 146. In other words, the longitudinal axis A3, A5, A7 of the head 28 of the T-bolt 26 is aligned with the longitudinal axis A4, A6, A8 of the track 82, 114, 146. In this position, the head 28 of the T-bolt 26 is aligned with the interior 106, 138, 170 of the track 82, 114, 146 so that the head 28 of the T-bolt 26 may move longitudinally within the interior 106, 138, 172 of the track 82, 114, 146 with the threaded shaft 30 extending upward from the head 28 through the slot 109, 141, 173 in the track 82, 114, 146.

Figure 6:
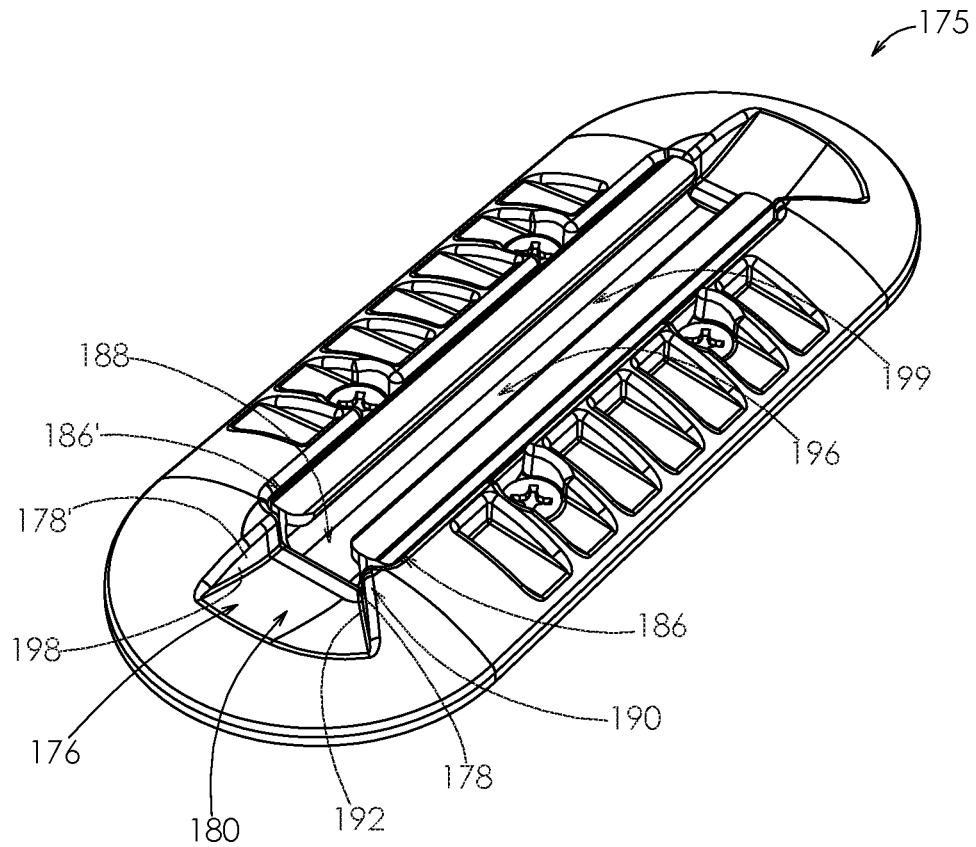
FIG. 6 is a perspective view of an accessory mounting track incorporating T-bolt alignment geometry.

In FIG. 6, there is illustrated a perspective view of an accessory mounting track 175 incorporating T-bolt alignment geometry 176, wherein the track 175 is configured to be mounted to an environmental surface S. The alignment geometry 176 is at least partially defined by a first wall 178, which at least partially bounds a physical space 180 dimensioned and configured to receive the head 28 of a T-bolt 26. The first wall 178 extends from a first side wall 186 of the track 175 at the opening 188 at the terminal end 190 of the track 175. An inner surface 192 of the first wall 178 forms a first alignment feature (i.e., a rotation feature), which is encountered by the flange 32 of the head 28 of the T-bolt 26 upon moving the T-bolt 26 in a longitudinal direction (i.e., upward when viewing FIG. 6) toward the opening 188 at the terminal end 190 of the track 175. As clearly shown, the first alignment feature 192 is presented to one side of the alignment geometry 176, and thus is presented to one side in relation to the interior 196 of the track 175 proximate the opening 188 at the terminal end 190 of the track 175. When the head 28 of the T-bolt 26 encounters the first alignment feature 192, the first alignment feature 192 causes the head 28 to rotate (i.e., in a clockwise direction when viewing FIG. 6). Upon continued movement of the T-bolt 26, the head 28 of the T-bolt 26 continues to rotate (i.e., in a clockwise direction) until a leading flange 32' of the head 28 of the T-bolt 26 encounters an inner surface 198 of an opposing second side wall 178' of the alignment geometry 176. This inner surface 198 forms a second alignment feature, which stops the T-bolt 26 from rotating at a point in which the head 28 of the T-bolt 26 is positioned in a longitudinal direction in relation to the track 175 so that the head 28 of the T-bolt 26 is aligned with the interior 196 of the track 175 so that head 28 of the T-bolt 26 may move longitudinally within the interior 196 of the track 175 with the threaded shaft 30 extending upward from the head 28 through the slot 199 in the track 175.

It should be understood from the description above that the T-bolt alignment geometry can be incorporated into the track, as illustrated in FIG. 1, or into a secondary component or components in communication with the track, as illustrated in FIGS. 2-5. Secondary components may be in the form of end caps, suitably supported in relation to the terminal ends of the track. The alignment geography may be formed into an environmental mounting surface, such as a space within the surface of a vehicle or vessel, such as an all-terrain vehicle of a kayak. The alignment geography may be in the form of a track adapter that encompasses the extents of the track without compromising the accessory mounting functionality of the track slot and T-bolt combination.

The alignment geometry forces rotation of the T-bolt to properly align the T-bolt for entry into the opening in the terminal end of the track regardless of the planar orientation of the head of the T-bolt. The T-bolt flange upper and lower surfaces or planes should be approximately parallel with the interior bottom surface and upper flange of the track. The T-bolt and slot can be fashioned to exclude planar surfaces, but the idea holds true that the extents of the T-bolt flange must be generally aligned to fit within the bounds of the slot cross-sectional profile in order to travel into the slot unimpeded.

It should be noted that orientational terms used throughout this description are with reference to the orientation of the track, T-bolt and T-bolt alignment geometry as presented in the accompanying drawings, which is subject to change depending on the orientation of the various parts and components. Therefore, orientational terms are used for semantic purposes, and do not limit the invention or its component parts in any particular way.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST 10 accessory mounting track
12 slot
14 upper walls
16 upper surface
18, 18' side walls
20 interior
22 opening
24 terminal end of the track
26 T-bolt
28 head 28
30 threaded shaft
32, 32' flanges
L length
W width
34 alignment geometry
36 physical space
38 first alignment feature
40 second alignment feature
42 inner surface
44 T-bolt alignment geometry
46 accessory mounting track
48 perimeter wall
50 pocket
52 physical space
56, 56' side walls
58, 58' side walls
60 opening
62 terminal end
64 inner surface
66 first alignment feature
68 interior
70 distal end
72 first clearance
74 second clearance
76 inner surface
77 second alignment feature
A1 longitudinal axis
A2 longitudinal axis
78 slot
80, 112, 144 alignment geometries
82, 114, 146 accessory mounting track
84, 116, 148 perimeter wall
86, 118, 150 pocket
88, 120, 152 physical space
92, 126, 158 first side wall
94, 128, 160 side wall
94', 128', 160' side wall 98, 130, 162 opening
100, 132, 164 terminal end
102, 134, 166 inner surface
106, 138, 170 interior
108, 140, 172 second clearance
109, 141, 173 slot
110, 142, 174 inner surface
A3, A5, A7 longitudinal axis
A4, A6, A8 longitudinal axis
175 accessory mounting track
176 T-bolt alignment geometry
S environmental surface
178, 178' first wall
180 physical space
186, 186' side wall
188 opening
190 terminal end
192 inner surface
196 interior
198 inner surface
199 slot

What is claimed is:

1. An exemplary accessory mounting track comprising:
an interior bounded at least partially by opposing upper walls and opposing side walls, the interior being shaped to receive a head of a T-bolt, and
alignment geometry at an opening at a terminal end of the track in communication with the interior of the track, the alignment geometry comprising:
a rotation feature configured to cause the T-bolt to rotate, and
a stop feature configured to cause the T-bolt to stop rotating and generally align the T-bolt with the interior of the track, wherein the alignment geometry is at least partially defined by a perimeter wall, which defines a pocket that bounds a physical space dimensioned and configured to receive the head of a T-bolt, wherein the perimeter wall is shaped to form a first side wall that extends longitudinally from a first side wall of the track at an opening at a terminal end of the track, the perimeter wall extending about the physical space and returning back to a second side wall that extends into a second side wall of the track at the opening at the terminal end of the track so as to extend longitudinally from the second side wall of the track, and wherein an inner surface of the perimeter wall is bumped out to form the rotation feature, which is encountered by a flange of the head of the T-bolt upon moving the T-bolt in a longitudinal direction toward the opening at the terminal end of the track.

2. The track of claim 1, wherein the rotation feature is presented to one side of the alignment geometry, and thus is presented to one side in relation to the interior of the track proximate the opening at the terminal end of the track.

3. The track of claim 1, wherein the bumped out inner surface of the perimeter wall is configured so that, when the head of the T-bolt encounters the bumped out inner surface, the bumped out inner surface causes the head to rotate.

4. The track of claim 1, wherein a distal end of the alignment geometry, farthest from the track, provides a first clearance for the rotation of the head of the T-bolt.

5. The track of claim 4, further comprising a second clearance provided beyond the rotation feature, the second clearance being configured to permit the head of the T-bolt to continue to rotate until a leading flange of the head of the T-bolt encounters the bumped out inner surface of the perimeter wall, which stops the T-bolt from rotating at a point in which the head of the T-bolt is positioned in a longitudinal direction in relation to the track.

6. An exemplary accessory mounting track comprising:
an interior bounded at least partially by opposing upper walls and opposing side walls, the interior being shaped to receive a head of a T-bolt, and
alignment geometry at an opening at a terminal end of the track in communication with the interior of the track, the alignment geometry comprising:
a rotation feature configured to cause the T-bolt to rotate, and
a stop feature configured to cause the T-bolt to stop rotating and generally align the T-bolt with the interior of the track, wherein the alignment geometry is at least partially defined by a perimeter wall, which defines a pocket that bounds a physical space dimensioned and configured to receive the head of a T-bolt, the perimeter wall being shaped to form a first side wall that extends from a first side wall of the track at an opening at a terminal end of the track.

7. The track of claim 6, wherein the perimeter wall extends about the physical space and returns back to a second side wall of the track at the opening at the terminal end of the track.

8. The track of claim 6, wherein an inner surface of the perimeter wall defines the rotation feature, which is encountered by the a flange of the head of the T-bolt upon moving the T-bolt in a longitudinal direction toward an opening at the terminal end of the track, the rotation feature being presented to one side of the alignment geometry, and thus is presented to one side in relation to the interior of the track proximate the opening at the terminal end of the track.

9. The track of claim 8, wherein the rotation feature is configured to rotate the head of the T-bolt when the head of the T-bolt encounters the rotation feature.

10. The track of claim 8, further comprising a second clearance provided beyond the first alignment feature, wherein continued movement of the T-bolt causes the head of the T-bolt to continue to rotate until a leading flange of the head of the T-bolt encounters the inner surface of the perimeter wall that forms a stop feature, which stops the T-bolt from rotating at a point in which the head of the T-bolt is positioned in a longitudinal direction in relation to the track.

* * * * *